US008352933B2

(12) United States Patent
Amann et al.

(10) Patent No.: US 8,352,933 B2
(45) Date of Patent: Jan. 8, 2013

(54) CONCURRENT PATCHING OF OPERATING SYSTEMS

(75) Inventors: Stefan Amann, Boeblingen (DE); Robert Breker, Ginsheim-Gustavsburg (DE); Holger Smolinski, Simmozheim (DE); Angel Nunez Mencias, Stuttgart (DE)

(73) Assignee: International Business Machines Corporation, Armonk, NY (US)

(*) Notice: Subject to any disclaimer, the term of this patent is extended or adjusted under 35 U.S.C. 154(b) by 423 days.

(21) Appl. No.: 12/645,617

(22) Filed: Mar. 8, 2010

(65) Prior Publication Data

US 2010/0250908 A1 Sep. 30, 2010

(30) Foreign Application Priority Data

Mar. 26, 2009 (EP) .................................. 09156287

(51) Int. Cl.
*G06F 9/44* (2006.01)
(52) U.S. Cl. .................................. 717/170; 717/168
(58) Field of Classification Search .................. 717/100, 717/120–123, 168–173
See application file for complete search history.

(56) References Cited

U.S. PATENT DOCUMENTS

| | | | | |
|---|---|---|---|---|
| 6,189,145 | B1* | 2/2001 | Bellin et al. | 717/170 |
| 6,202,208 | B1* | 3/2001 | Holiday, Jr. | 717/166 |
| 6,341,321 | B1* | 1/2002 | Glassen et al. | 710/104 |
| 6,421,679 | B1* | 7/2002 | Chang et al. | 1/1 |
| 7,735,078 | B1* | 6/2010 | Vaidya | 717/171 |
| 7,784,044 | B2* | 8/2010 | Buban et al. | 717/168 |
| 7,788,661 | B2* | 8/2010 | Axnix et al. | 717/168 |
| 7,913,243 | B2* | 3/2011 | Axnix et al. | 717/168 |
| 2004/0107416 | A1* | 6/2004 | Buban et al. | 717/170 |
| 2006/0080385 | A1* | 4/2006 | Blandford et al. | 709/203 |
| 2006/0112381 | A1* | 5/2006 | Bayus et al. | 717/168 |
| 2006/0242491 | A1 | 10/2006 | Axnix et al. | |
| 2007/0006201 | A1 | 1/2007 | Axnix et al. | |
| 2009/0217255 | A1* | 8/2009 | Troan | 717/168 |

OTHER PUBLICATIONS

Jun Sun et al "Supporting Multiple OSes with OS Switching" 2007 USENIX Annual Technical Conference, pp. 357-362.
Jeffrey B Arnold "Ksplice: An Automatic System for Rebootless Linux Kernel Security Updates", Massachusetts Institute of Technology, pp. 1-13, 2008.

* cited by examiner

*Primary Examiner* — Wei Zhen
*Assistant Examiner* — Qing Chen
(74) *Attorney, Agent, or Firm* — Steven Chiu

(57) ABSTRACT

Replacing a computer program with a replacement version concurrently with its execution by a first instance of an operating system in a computer system, wherein a persistent memory area in the computer system is used to store selected data from the first instance. A snapshot image of a second instance of the operating system, wherein in the second instance the replacement version was executed instead of the computer program, is provided to the computer system. The execution of the first instance is suspended and the first instance is replaced with data from the snapshot image while preserving the persistent memory area. The execution of the first instance is resumed and data from the persistent memory area is restored in the first instance.

16 Claims, 4 Drawing Sheets

CONCURRENT PATCHING OF OPERATING SYSTEMS

CROSS REFERENCE TO RELATED APPLICATION

This application claims priority under 35 U.S.C. §119 from European Patent Application No. 09156287.6 filed Mar. 26, 2009, the entire contents of which are incorporated herein by reference.

BACKGROUND

1. Field of the Invention

The present invention relates to computer systems with high availability, and concurrent patches of computer programs. More particularly, a method, a computer implemented program and a device for replacing a computer program with a replacement version concurrently with its execution by a first instance of an operating system in a computer system are provided.

2. Description of the Related Art

Methods for concurrently patching computer system firmware have been proposed in US 2006/0242491 A1 and US 2007/0006201 A1. With these methods only a single firmware thread can be used on a processing unit without pre-emption of threads. Such firmware thread returns to a dispatcher before the actual patch processing starts. Stacks are thus empty and no function of a firmware thread is executed. This requires the program to be designed to frequently return control. Further, the allocation of thread data needs a persistent area of the main memory of the computer system. This main memory area is not be erased during the concurrent patch. Therefore, these methods are not applicable for multi-threaded operating systems with pre-emption of threads, for which a dynamic adaptation of thread stack content and the re-calculation of execution pointers for each function of a specific thread is required.

Another approach is described in a paper by the Massachusetts Institute of Technology titled "Ksplice: An automatic system for rebootless Linux kernel security updates" and authored by J. B. Arnold. There the current version of a function is patched by replacing the first instruction in the function with a function call to the new version of the function. This approach provides only limited support for semantic changes or the introduction of new functions in the patch.

Kexec is a technique to replace an operating system kernel, which is used in Linux® distributions such as SUSE® Linux®. Kexec allows omitting the BIOS (Basic Input/Output System), which is used in many computer systems. But even with kexec all the other steps of an operating system boot procedure need to be performed, which add significant latency to a patch procedure.

Several methods to reduce the latency caused by an operating system boot procedure have been proposed. For example, in most modern operating systems with advanced power management a power-saving state is supported, wherein all hardware is powered off except for the main memory in order to save energy. When a computer system performs a suspend-to-RAM operation, the operating system stops applications, drivers and kernel in order, and stores all necessary information in the RAM (Random Access Memory) used as main memory of the computer system. When the computer system resumes, it retrieves operating state from main memory and restores the whole system to the state when it was suspended.

As described in J. Sun et al "Supporting Multiple OSes with OS Switching", Proc. of the 2007 USENIX Annual Technical Conference, pp. 357-362, such suspend/resume techniques can even be used to support the concurrent execution of multiple operating systems on a single computer.

High availability solutions also exist, wherein multiple computer systems and/or multiple logical computer systems partitions are used. An example of such solution is the VMware® Update Manager. In such solutions a second instance of an operating system is either executed in parallel or gets booted before the migration from the first instance takes place. Therefore, additional resources are needed for the second instance as well as some form of synchronization between the instances.

A combination of high-availability and suspend/resume techniques exists in VMware® VMotion, which allows migrating a virtual machine from one server computer system to another. Here, the entire state of a virtual machine is stored by a first server on a shared storage, from which it is used by a second server to establish a second instance of the virtual machine. VMotion keeps the transfer period imperceptible to users by keeping track of on-going memory transactions in a bitmap. Once the entire memory and system state has been copied over to the second server, VMotion suspends the source virtual machine, copies the bitmap to the second server, and resumes the virtual machine on the server. Since this approach requires virtual machines, it is not applicable for operating systems executed directly on the physical computer system or a (logical) partition of the computer system. Further, a concurrent patch of the virtual machine management software needs to be handled differently.

BRIEF SUMMARY

According to one embodiment of the present invention, a method for replacing a computer program with a replacement version concurrently with its execution by a first instance of an operating system in a computer system is provided. The method includes providing a persistent memory area in the computer system to store selected data from the first instance, and providing a snapshot image of a second instance of the operating system, wherein in the second instance the replacement version was executed instead of the computer program. The method also includes suspending the execution of the first instance and replacing the first instance with data from the snapshot image while preserving the persistent memory area, and resuming the execution of the first instance and restoring data from the persistent memory area in the first instance.

According to another embodiment of the invention, the present invention provides an article of manufacture tangibly embodying computer readable instructions which, when implemented, causes a computer to carry out the steps of the above method.

According to yet another embodiment of the present invention, a device for replacing a computer program with a replacement version concurrently with its execution by a first instance of an operating system in a computer system is presented. The device includes a persistent memory area in the computer system to store selected data from the first instance. The device also includes kernel modules which: load and/or store a snapshot image of the first instance, suspend the execution of the first instance and replace the first instance with data from a snapshot image while preserving the persistent memory area. The kernel modules further

DETAILED DESCRIPTION

Figure 1:
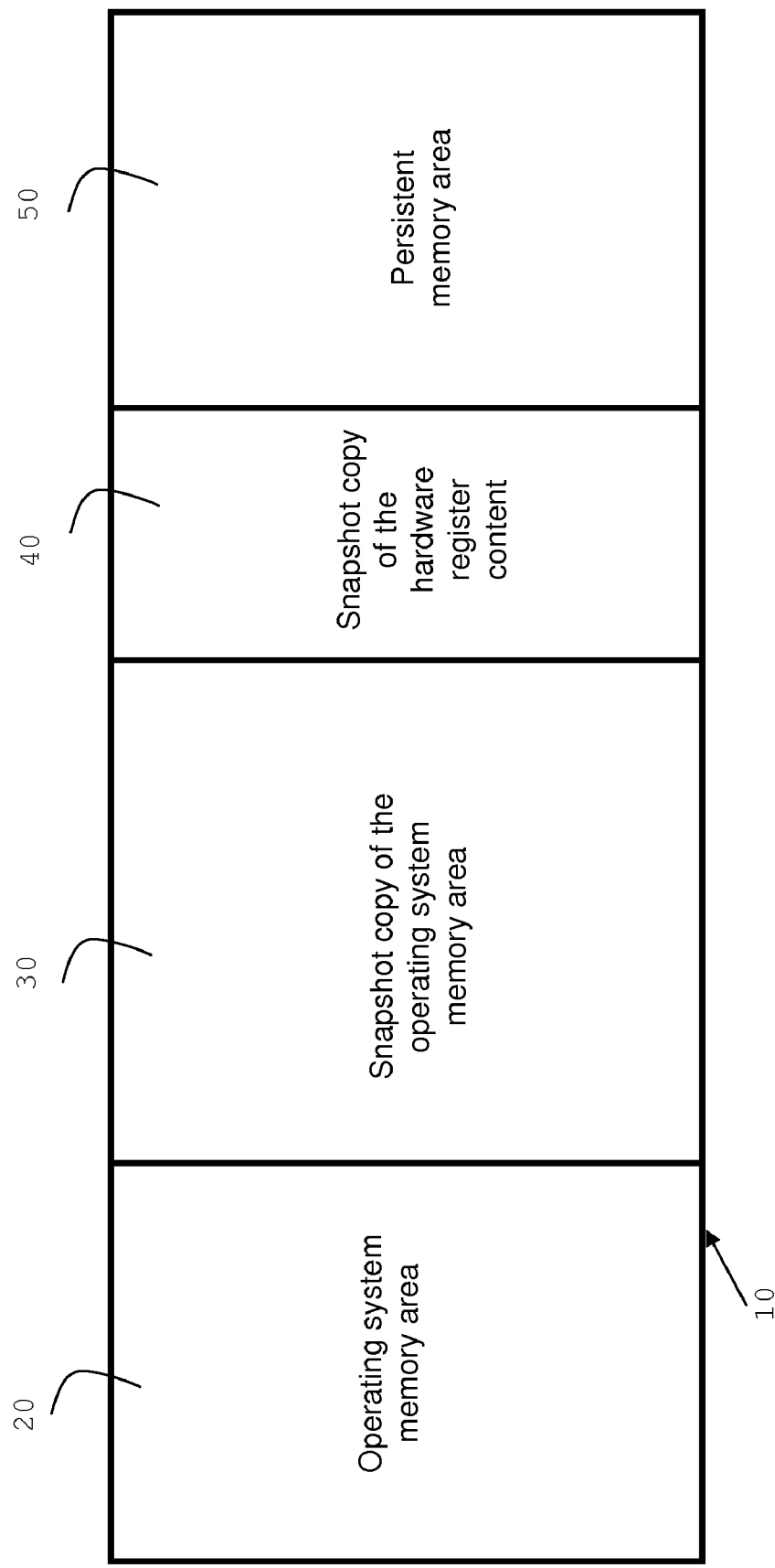
FIG. 1: Is a block diagram illustration a memory layout in accordance with the present invention.

Computer users have long had a need for continuous non-disrupted operation, even when a modified version of a computer program needs to replace the version executed currently. Therefore methods have been developed to modify and update computer programs concurrently with their execution with new code (a patch) that is loaded into the computer system. Such methods try to avoid the latency caused by a complete termination of the computer program execution and the start of the execution of the replacement version from scratch.

A snapshot of a running operating system can be generated by a development team on a separate development computer system. However, a problem exists in that such a snapshot can comprise a significant amount of data depending on the size of the main memory used by an operating system. Therefore, this is not a viable option for computer systems that are connected to modern networks such as an Intranet and/or the Internet via slow modem connections. Such modem connections are used in order to minimize the security exposures of mission critical computer systems.

Another option is to dynamically generate the snapshot in the production environment, e.g. on a different logical partition of the same computer system or on another computer system in a high-availability environment. In this case only the data needed to create the snapshot needs to be transferred to the production environment. Therefore, this is a viable option for the mission critical computer systems described above.

In order to simplify the implementation, external dependencies like hard disks and network connections are avoided during the actual snapshot generation and application process. The snapshot is stored to and applied from the main memory. This way there is no need to use a persistent storage device during the actual creation and application of the snapshot. An area of at least the same size as used by the operating system needs to be reserved for the snapshot generation. In addition, some space for saving the contents of all needed hardware registers (e.g. registers of central processing units) needs to be reserved.

In modern operating systems the direct access to hardware such as the main memory and hardware registers is only possible for dedicated subsystems of the operating system. In many operating systems these subsystems are components of an operating system kernel in contrast to the user space, in which the actual applications are executed. Therefore, the generation and application of a snapshot image needs to be handled by such subsystems, e.g. as a kernel module.

It is preferable to minimize the functionality of a kernel to the bare minimum in order to reduce the implementation complexity and the risks caused by a malfunction of the kernel module. Some modern operating system kernels allow providing access to the reserved main memory area via a special file (e.g./dev/mem in Linux®). This allows copying the snapshot image from the main memory area to a persistent storage device using the special file. The kernel module needs to provide an interface by which an application in user space can request the creation or application of a snapshot image. For example, in operating systems compliant to the POSIX® (Portable Operating System Interface) standard (e.g. Linux®) this can be achieved by a device driver, which is accessible from user space via so-called ioctl system calls.

When a snapshot image is applied, then all code and data in the main memory area used by the operating system is replaced with the code and data included in the snapshot image. This way it is possible to replace each and every operating system component and application, which is currently executed on the computer system with a different version. This can include kernel and user space components. However, state information used by these components and applications in order to reflect the current state of their execution is then lost. This may not be a problem for many components and applications, but is unacceptable for some critical components and applications. Examples for such critical components and applications are operating system kernel device drivers which have dependencies to hardware states and applications using these device drivers. Other examples are applications that interact with users of the computer system.

Typically, a computer program is divided in the following segments in the main memory: code, data, heap, and stack. The code segment needs to be replaced in any case during the application of a concurrent patch especially if it does not contain any state information which needs to be preserved during the concurrent patch operation. However, when the code segment is replaced the stack segment and the current program counter of the processor executing this code segment become invalid. Due to the replacement of the code segment it is possible that new global variables are introduced, the content of variables needs to be maintained or variable names have changed. Therefore, it is possible that also the data segment needs to be adapted. Similarly, the heap needs to be adapted. In many cases, such dependencies are only known to the developers of the computer program.

Therefore, a new area of the main memory is provided. The content of this area is preserved during the concurrent patch operation and can be used by the developers of critical components in order to store data, which needs to be preserved in a concurrent patch operation. But the content of the computer program segments such as code, data, heap, and stack will be replaced during a concurrent patch operation.

With reference now to FIG. 1, the main memory segment 10 assigned to an operating system in accordance with the invention is divided therefore in the following segments: an area 20 used by the operating system directly, an area 30 used to store the copy of the area 20 in a snapshot image, an area 40 used to store the copy of the content of the hardware registers in a snapshot image, and a persistent memory area 50 used by the critical components to store critical data to be preserved during a concurrent patch operation. The main memory areas 30, 40, and 50 need to be excluded from the usual memory management of the operating system, which is restricted to the area 20 only. For example, with modern operating systems such as Linux® this can be achieved easily via boot parameters.

Figure 2:
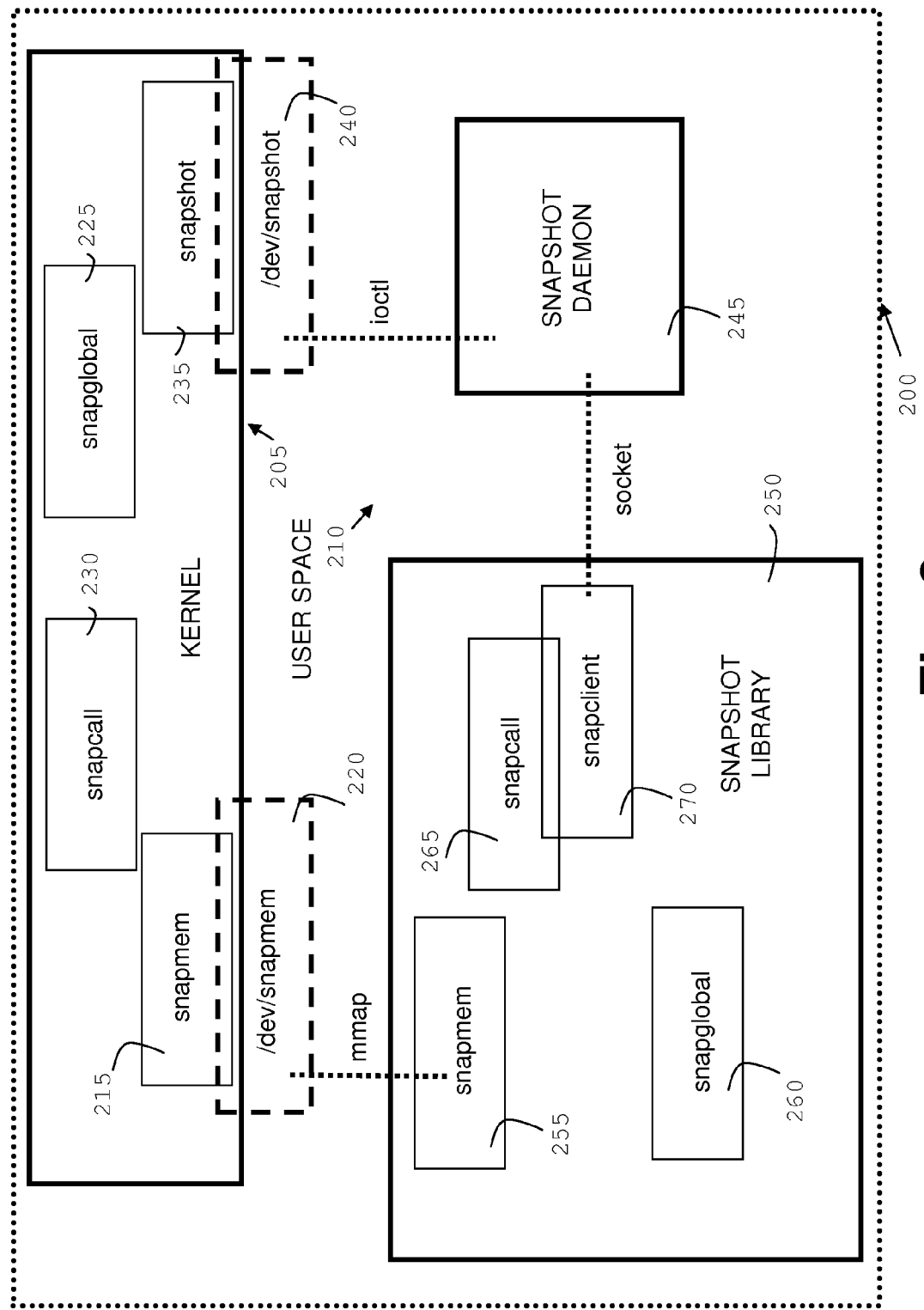
FIG. 2: Is a block diagram illustrating an operating system instance in accordance with the present invention.

In the preferred embodiment of the invention shown in FIG. 2, an operating system 200 with a kernel 205 and a user space 210 and support for virtual memory management is used. The implementation is split up into kernel modules and user space components.

An operating system kernel module snapmem 215 implements the memory management for the persistent main memory area 50. It provides two functions for other kernel modules:

void *pmalloc (unsigned long size):

allocates and returns the virtual address to the beginning of a memory area of the requested size;

void pfree (void *mem):

releases the allocated memory area beginning at the virtual address for the parameter mem.

The memory provided by the kernel module snapmem 215 can be used by components just like the usual heap memory. The kernel module snapmem 215 is itself a critical component and must use the persistent memory area 50 directly in order to store its critical data which needs to survive a concurrent patch operation. The memory management underlying the functions pmalloc and pfree can be implemented on usual memory allocators, e.g. the allocator described in the article "Inside memory management—The choices, tradeoffs, and implementations of dynamic allocation" from Jonathan Bartlett, which was published in the Internet.

The persistent memory management interface between kernel 205 and user space 210 is implemented using a system call interface, which is compliant to the POSIX standard. The system call function mmap (void*start, size_t length, int prot, int flags, int fd, off_t offset)

is used by the critical components in the user space 210 to allocate memory in the persistent memory area 50. The kernel module snapmem 215 registers a device and binds it to the mmap system call. This device is represented in the user space 210 via a dedicated file snapmem 220 in the /dev tree. The binding is implemented by registering a special handler function in the kernel module snapmem 215:

int do_mmap (file*filp, vm_area_struct *vma)

This handler function implements the actual memory management of the persistent memory area 50 for the critical components executed in the user space 210. The memory areas allocated in the persistent area 50 will be mapped into the virtual address space of the critical component, which calls the mmap system call with a file descriptor fd referencing the device via the file /dev/snapmem 220. The handler function do_mmap maintains a list of the critical components for which it has reserved memory areas in the persistent memory area 50. For example, the critical components can be identified based on the filename of their executable code image in a filesystem mounted by the operating system. For every critical component in the list, the handler function do_mmap maintains a list with memory mappings, which comprises information which physical addresses are mapped to which virtual addresses. This information is maintained because the memory segments mapped to an application need to be remapped after the application of a snapshot image. The mapping is bounded to pages of the address space because of limitations in typical virtual address management schemes.

In case a critical component in the user space 210 is notified by the operating system kernel 205 that a concurrent patch operation was performed, it needs to perform a mmap system call in order to re-map the memory areas allocated in the persistent memory area 50 to its virtual address space. Then the kernel handler function do_mmap recognizes that a concurrent patch operation was just performed and is searching its list of critical components. If the calling critical component is found in the list, then it performs the re-mapping by using the same virtual addresses for the mapping into the virtual address space of the critical component as used before the concurrent patch operation.

Since the critical components in the kernel 205 need to save the virtual addresses of the allocated memory areas in the persistent memory area 50 and these saved addresses need to survive a concurrent patch operation, the kernel module snapglobal 225 is provided. It offers the following interface functions to other kernel modules:

void registerGlobal (char name, void address, size_t size):

registers a global variable of the given size on the given virtual address with the given name;

void unregisterGlobal (char name):

deletes a registered global variable with the given name;

void exportGlobals (void):

exports the registered global variables to the persistent memory area 50;

void importGlobals (void):

imports the content of the global variables from the persistent memory area 50.

The implementation of these functions in the kernel module snapglobal 225 is straightforward. A list of registered global variables will be created in the normal heap segment. This list will be walked through when the function registerGlobal is called. For example, this can be implemented using a hash table, with the names of the global variables as keys. In case no entry is found in the list, which matches the given name and address, then a new corresponding entry is appended to the list. When the function unregisterGlobal is called, a matching entry is deleted from the list. When the function exportGlobals is called, a corresponding list will be created in the persistent memory area 50. A call of the function importGlobals after the load of a snapshot image leads to a comparison of the list in the heap and in the persistent memory area 50. If the name and size fields of the corresponding entries in both lists are matching, the content of the address fields will be copied from the persistent memory area 50 into the heap. Since also the address of the start of the list in the persistent memory area 50 needs to survive a concurrent patch operation, this address is stored in a fixed memory location.

The critical components in the kernel 205 need to be notified about the start and completion of a concurrent patch operation. Therefore, the kernel module snapcall 230 is provided, which offers the following interface functions to other kernel modules in order to register their handler functions for concurrent patches:

void registerSnapshotHandler (snapshot_handler *handler):

registers a given snapshot handler;

void unregisterSnapshotHandler (snapshot_handler *handler):

removes the registration of the given registered handler function;

void callSnapshotHandler (int type):

calls all registered handler functions for a given event type.

The kernel module snapcall 230 uses a list of registered snapshot handlers. The interface function use a structure snapshot_handler, which is used to pointers to functions, which will be called by the kernel module snapcall 230 for certain snapshot events. The function callSnapshotHandler is responsible for the notification of the registered critical components via their registered handler functions. Further, it is responsible for the processing of any return messages of the critical components. The different handler functions can be called by the kernel module snapcall 230 synchronously or asynchronously.

The kernel module snapshot 235 is responsible for the loading and saving of a snapshot image. It includes the following internal functions, which need to be invoked from the user space 210 using the ioctl system calls described above:
int snapshot_store (void):
creating of a snapshot image based on the current state of the operating system 200;
int snapshot_load (void):
loading of a snapshot image from the memory areas 40 and 50.

The kernel module snapshot 235 calls the function callSnapshotHandler of the kernel module snapcall 230 before and after it loads or saves a snapshot image. This way the registered critical components will be notified about these activities. This enables the critical components to finish pending critical operations and to store critical data in the persistent memory area 50 before the actual patch operation is performed, or to load critical data from the persistent memory area 50 when an actual patch operation was performed. The store and load is only required if there is state information which is not continuously maintained in the persistent memory area 50.

For the generation of a snapshot image by the kernel module snapshot 235, parts of an existing suspend-to-RAM/resume functionality of an operating system can be used or a similar function can be implemented. This functionality needs to include some of the following steps in order to prevent changes to the main memory area 20 of the operating system 200, which would lead to an inconsistent snapshot image:
  deactivation of interrupts since interrupt handlers can modify the main memory area 20;
  deactivation of processors which do not need to be involved;
  processing of the currently active interrupts;
  prevention of any DMA transfer to and from the main memory area 20;
  copying the main memory area 20 used by the operating system 200 and the hardware register contents to the reserved main memory areas 30 and 40 respectively;
  undoing the changes of the steps preceding the copying step.

Once the generation of the snapshot is complete, it can be copied to a persistent storage device such as a harddisk of the computer system or a Storage Area Network (SAN) device. Preferably, the snapshot image will be stored in compressed and encrypted form in order to save resources and to prevent unauthorized access to the actual data in the snapshot image.

Similar steps need to be performed when the snapshot image is loaded. The snapshot image needs to be copied from the harddisk to the reserved main memory areas 30 and 40 and then the sequence of the following steps needs to be performed:
  deactivation of interrupts since interrupt handlers can be overwritten;
  deactivation of processors which do not need to be involved;
  processing of the currently active interrupts;
  prevention of any DMA transfer to and from the main memory area 20;
  disabling of the paging as the page table of the virtual memory management will be overwritten with the content from the snapshot image;
  copying the content of the reserved main memory area 30 to the area of the main memory used by the operating system 20;
  loading the hardware registers from the main memory area 40;
  undoing the changes of the steps preceding the copying step.

With modern computer systems these steps for the application of a snapshot image can be performed very quickly, wherein time is most spent for the copying of the snapshot image into the main memory area 20 used by the operating system.

The kernel module snapshot provides an interface to the user space 210 by means of a device accessible in the file /dev/snapshot 240 similarly as the file /dev/snapmem 220. To this device a handler function is registered for the ioctl system call. This allows applications in the user space 210 to send commands to the kernel module snapshot 235. The handler function calls the functions snapshot_store and snapshot_load dependent of the parameter of the ioctl call.

The snapshot daemon 245 is the interface to the concurrent update functionality in the user space 210. It invokes the actual snapshot activities through the device provided by the kernel module snapshot 235. A snapshot library 250 is the interface to the concurrent patch functionality for the critical components in the user space 210. It provides similar functionality as the kernel modules snapmem 215, snapcall 230 and snapglobal 225. The snapshot library 250 communicates with the snapshot daemon 245 via POSIX Local IPC (Inter-Process Communication) sockets. This allows an inter-process communication between the snapshot daemon 245 and the registered critical components. The following message types are used for the inter-process communication:
PING: critical component registers to the snapshot library 250 with its process ID (PID);
SIGNOFF: critical component unregisters from the snapshot library 250 via its PID;
PREPAREDONE: critical component successfully completed its pre- and postprocessing steps for a concurrent patch operation;
PREPARESNAPSHOTLOAD, PREPARESNAPSHOTSAVE: snapshot daemon 245 notifies critical component about a snapshot actions;
SNAPSHOTLOAD, SNAPSHOTSTORE: dedicated (not necessarily critical) component requests a snapshot load or save action.

A special kind of registered component, which does not need to be a critical component, provides the actual interface to manually and/or automatically trigger a snapshot action. For example, such actions can be manually entered via a console command. In case of a snapshot load or snapshot save action, all the registered critical components will be notified. Once all notifications are submitted to the critical components, the snapshot daemon 245 waits for the response from the critical components and/or a certain amount of time until it finally triggers the snapshot action via the device file /dev/snapshot 240.

The snapshot daemon 245 maintains a list of registered critical components. This list contains the actual state of running critical components. In order to detect the abnormal termination of their execution, components have to register frequently to the snapshot daemon 245 by sending PING messages. The entries in the list contain a field for the PID of the critical component and a field lastping, which contains the timestamp when the last PING message was received from the associated critical component. When a PING message is received, the list will be searched for the PID and the field lastping of a matching entry is updated. If no matching entry is found, a new entry is added to the list. In case a SIGNOFF message is received, the associated entry is removed from the list.

When a LOADSNAPSHOT or a STORESNAPSHOT message is received, a new thread of execution is created by the snapshot daemon 245. In case of a LOADSNAPSHOT message the thread loads the snapshot image to the reserved memory areas 30 and 40. In case of a STORESNAPSHOT message, the snapshot image will be copied from the reserved memory area 30 and 40 to a persistent storage device.

The snapshot library 250 provides an interface to the kernel module snapmem 215 for the critical components via the following interface functions implemented in the library module snapmem 255:
void *pbmalloc (size_t size):
allocates a memory block in the persistent memory area 50;
void pbfree (void *mem):
releases the memory block beginning at the given virtual address in the persistent memory area 50.

The interface functions pbmalloc and pbfree use the functionality of the kernel module snapmem 215 via the file /dev/snapmem 220 with the mmap and munmap system calls. As the virtual memory allocated in the persistent memory area 50 needs to be re-mapped for the critical components, the library module 255 is itself a critical component, which needs to be notified of the loading and application of a snapshot image. When it receives such notification, it will perform a mmap system call to the file /dev/snapmem 220.

Further, the snapshot library 250 provides an interface similar to the interface functions of the kernel module snapglobal 225 via the following interface functions implemented in the library module snapglobal 260:
void registerGlobal (char name, void address, size_t size):
registering of a global variable with a given name, address and size;
void unregisterGlobal (char name):
deleting of a registration for a variable with a given name.

The name of a global variable does not need to be unique for all critical components. It is sufficient if the name is unique for the virtual address space of the critical component. The implementation of the kernel module snapglobal 225 can be re-used for the implementation of the library module snapglobal 260.

The snapshot library 250 provides also an interface similar to the interface functions of the kernel module snapcall 230 via the following interface functions implemented in the library module snapcall 265:
registerSnapshotHandler (snapshot_handler *handler):
registering of a given snapshot handler function;
unregisterSnapshotHandler (snapshot_handler *handler):
deleting the registration of a given handler function.

The library module snapcall 265 must be notified by the snapshot daemon 245 about snapshot actions. It uses functions from an additional library module snapclient 270 for the communication with the snapshot daemon 245. Therefore, the implementation of the kernel module snapcall 230 can be reused for the implementation of the library module snapcall 265. The library module snapclient 270 creates two additional threads of execution during its initialisation. One of the threads notifies the snapshot daemon every 5 seconds that the library module snapclient 270 is still active and wants to be notified about snapshot actions. The other thread waits for messages from the snapshot daemon 245 indicating snapshot actions. If such message is received, then the library module snapcall 265 is called and all registered handler functions will be processed. Once all registered handler functions are processed, a message will be sent by the library module snapclient 270 to the snapshot daemon 245.

Figure 3:
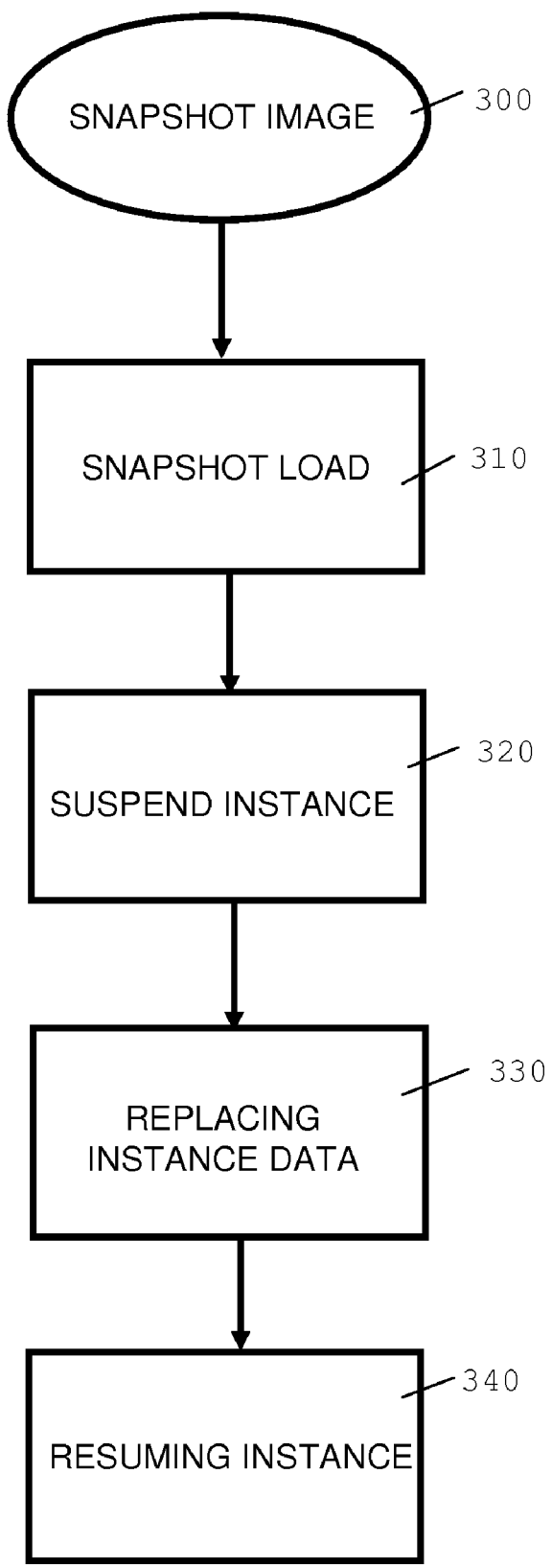
FIG. 3: Is a flow diagram illustrating a method in accordance with the present invention.

FIG. 3 illustrates the method steps performed during the application of a concurrent patch. The snapshot image 300 is loaded into the main memory of the computer system in step 310. Then the execution of the operating system instance is suspended in step 320. Now the data in the operating system instance is replaced with data from the snapshot image 300 in step 330. Finally, the execution of the operating system instance is resumed in step 340.

It is possible to replace only the kernel 205 instead of the entire operating system instance 200. This has the advantage that applications in the user space 210 can be patched separately, while a standard mechanism for patching the kernel 205 is available. The content of the operating system kernel 205 is typically not controlled by a computer system user who has control of the content of applications in the user space 210 only.

In case that only a concurrent patch operation for the kernel 205 is performed, this operation is either completely transparent to the applications in the user space 210, or these applications need to potentially adapt after the concurrent patch operation. Such adaptations might be necessary for some I/O (Input/Output) operations, which need to be potentially drained. In one embodiment of the invention the applications remember their ongoing I/O operations including their sequence numbers in an I/O journal similar to the journaling in filesystems. If an I/O operation is completed, it will be removed from the I/O journal. The I/O operations stored in the I/O journal will be restarted after a concurrent patch operation. The I/O journal is stored in the persistent memory area 50 in order to survive a concurrent patch operation.

The kernel 205 needs to store dynamic data related to the applications from the user space 210 in the persistent memory area 50. For example, such dynamic data can comprise structures for tasks, files and virtual memory areas. When the kernel 205 was replaced, the dynamic data needs to be restored from the persistent memory area 50.

The replacement of the kernel 205 can be made transparent to the applications in the user space 210 if all active I/O operations between kernel 205 and user space 210 are automatically re-established after the kernel 205 was replaced. In one embodiment of the invention the I/O journal described above is maintained by the associated device drivers instead of the application itself. The transparency is then achieved by intercepting I/O relevant system calls.

It may not be allowed, or desired to abort or drain I/O operations during concurrent patch. It may further not be allowed to trigger an I/O operation a second time to hardware, or attached devices. For this purpose, the kernel 205 needs to allow I/O operations to continue in hardware, and finish processing them after concurrent patch. To achieve this, the kernel 205 needs to re-establish the I/O configuration, and re-establish the context of each I/O operation. The context of an I/O operation is typically not kept in distinct places. It is distributed, for example on stacks, or just indirectly defined by a threads state. This makes it difficult to simply save the I/O context and re-establish it after a concurrent patch. In order to re-establish an I/O context, the kernel 205 will thus instead maintain a list of each active I/O operation. Each I/O operation is identified by unique properties (such as the target port/LUN address, the target Logical Block Address, host buffer addresses, transfer length, and a sequence number, and the tag, which is used to identify the I/O request between the kernel and hardware). When I/O requests get restarted after concurrent patch, the kernel 205 recognizes that the I/O request has been restarted by checking its properties and omits sending it to the hardware. When a request completes from the hardware, the kernel 205 can associate the newly created I/O context by the tag and finish back-end processing of the I/O operation normally.

In one embodiment of the invention, the snapshot image can be created from an identical operating system image instance as the currently running operating system instance. In other words, the replacement version of the computer program to be patched is identical to the original version. This allows using the invention for the implementation of a software failover solution. In the case of a critical software failure, the operating system instance can be replaced concurrently with an instance from a snapshot image. After the replacement, the operating system instance can continue with its normal operation.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 4:
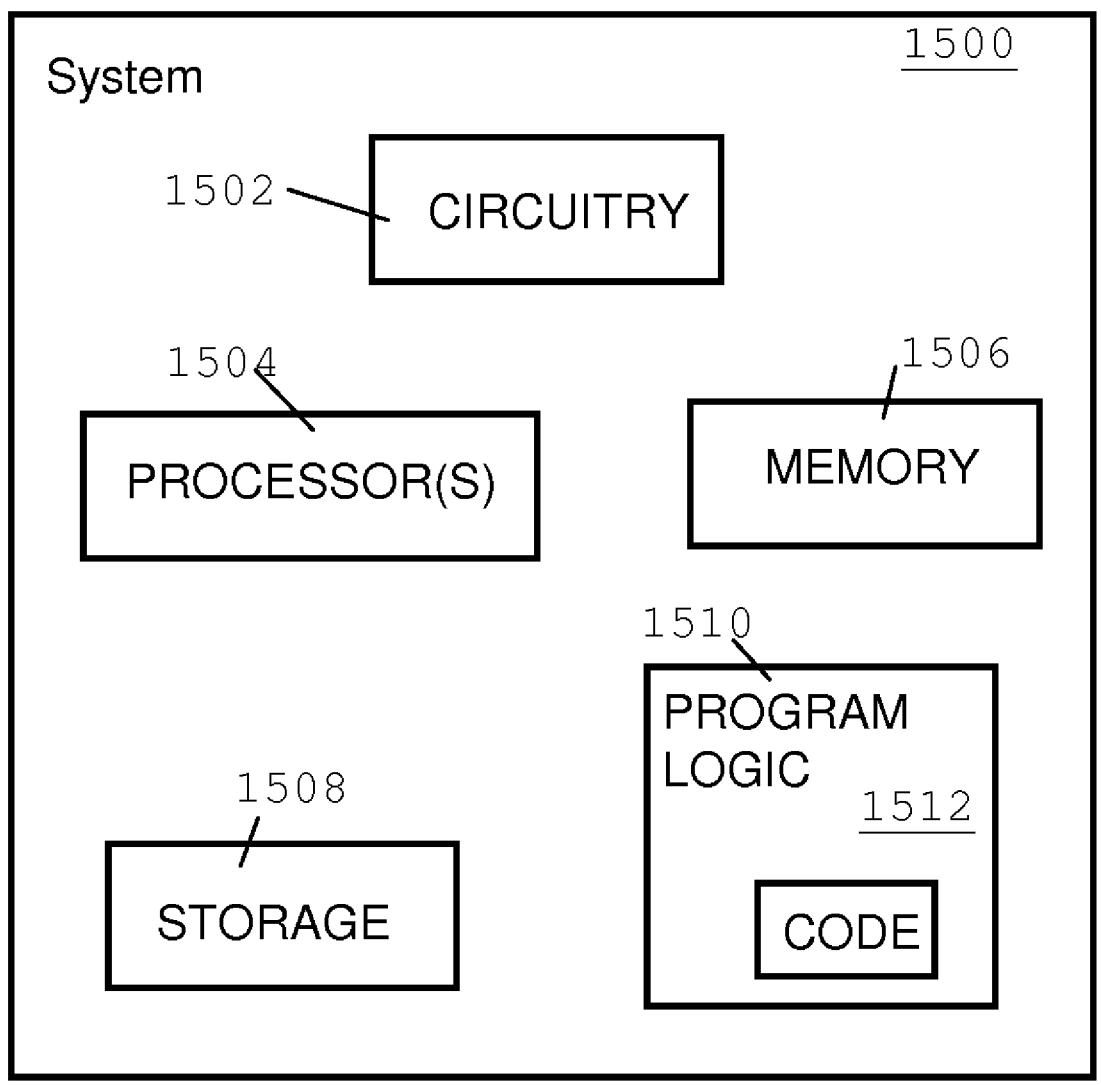
FIG. 4: Is a block diagram of a system in which certain embodiments may be implemented.

FIG. 4 illustrates a block diagram of a computer system 1500 in which certain embodiments may be implemented.

The system 1500 may include a circuitry 1502 that may in certain embodiments include a microprocessor 1504. The computer system 1500 may also include a memory 1506 (e.g., a volatile memory device), and storage 1508. The storage 1508 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 1508 may comprise an internal storage device, an attached storage device and/or a network accessible storage device. The system 1500 may include a program logic 1510 including code 1512 that may be loaded into the memory 1506 and executed by the microprocessor 1504 or circuitry 1502. In certain embodiments, the program logic 1510 including code 1512 may be stored in the storage 1508. In certain other embodiments, the program logic 1510 may be implemented in the circuitry 1502. Therefore, while FIG. 4 shows the program logic 1510 separately from the other elements, the program logic 1510 may be implemented in the memory 1506 and/or the circuitry 1502.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

We claim:

1. A method for replacing a computer program with a replacement version of the computer program concurrently with the execution of the computer program by a first instance of an operating system in a computer system, the method comprising:
    providing a persistent memory area in said computer system to store selected data from said first instance of the operating system;
    providing a snapshot image of a second instance of the operating system, wherein in said second instance of the operating system, the replacement version of the computer program is executed instead of said computer program;
    loading said snapshot image of said second instance of the operating system into a main memory in said computer system;
    suspending the execution of said first instance of the operating system;
    replacing data in said first instance of the operating system with data from said snapshot image of said second instance of the operating system while preserving the selected data in said persistent memory area;
    resuming the execution of said first instance of the operating system; and
    restoring the selected data from said persistent memory area in said first instance of the operating system.

2. The method of claim 1, further comprising:
    registering a component for storing selected data in said persistent memory area;
    selecting data by said registered component;
    storing the selected data in said persistent memory area; and
    restoring the selected data in said persistent memory area for said registered component.

3. The method of claim 2, further comprising notifying said registered component about a snapshot action.

4. The method of claim 3, further comprising:
    selecting and storing data in said persistent memory area by said registered component when said registered component receives a notification about the start of a snapshot load action; and
    restoring the selected data from said persistent memory area by said registered component when said registered component receives a notification about the completion of the snapshot load action.

5. The method of claim 1, wherein the operating system comprises a kernel and a user space, wherein only said kernel is replaced with data from said snapshot image of said second instance of the operating system, while said user space is preserved.

6. A computer program product for replacing a computer program with a replacement version of the computer program concurrently with the execution of the computer program by a first instance of an operating system in a computer system, the computer program product comprising:
    a non-transitory storage medium readable by a processing circuit and storing instructions for execution by the processing circuit for performing a method comprising:
        providing a persistent memory area in said computer system to store selected data from said first instance of the operating system;
        providing a snapshot image of a second instance of the operating system, wherein in said second instance of the operating system, the replacement version of the computer program is executed instead of said computer program;
        loading said snapshot image of said second instance of the operating system into a main memory in said computer system;
        suspending the execution of said first instance of the operating system; replacing data in said first instance of the operating system with data from said snapshot image of said second instance of the operating system while preserving the selected data in said persistent memory area;
        resuming the execution of said first instance of the operating system; and
        restoring the selected data from said persistent memory area in said first instance of the operating system.

7. The computer program product of claim 6, further comprising:
    registering a component for storing selected data in said persistent memory area;
    selecting data by said registered component;
    storing the selected data in said persistent memory area; and
    restoring the selected data in said persistent memory area for said registered component.

8. The computer program product of claim 7, further comprising notifying said registered component about a snapshot action.

9. The computer program product of claim 8, further comprising:

selecting and storing data in said persistent memory area by said registered component when said registered component receives a notification about the start of a snapshot load action; and restoring the selected data from said persistent memory area by said registered component when said registered component receives a notification about the completion of the snapshot load action.

10. The computer program product of claim 6, wherein the operating system comprises a kernel and a user space, wherein only said kernel is replaced with data from said snapshot image of said second instance of the operating system, while said user space is preserved.

11. A device for replacing a computer program with a replacement version of the computer program concurrently with the execution of the computer program by a first instance of an operating system in a computer system, comprising a persistent memory area in said computer system to store selected data from said first instance of the operating system; and a kernel module to:

i) access a snapshot image of a second instance of the operating system, wherein in said second instance of the operating system, the replacement version of the computer program is executed instead of said computer program;

ii) suspend the execution of said first instance of the operating system;

iii) replace data in said first instance of the operating system with data from said snapshot image of said second instance of the operating system while preserving the selected data in said persistent memory area;

iv) resume the execution of said first instance of the operating system; and v) restore the selected data from said persistent memory area in said first instance of the operating system.

12. The device of claim 11, comprising at least one kernel module to:

register a component for storing selected data in said persistent memory area;

select data in said registered component;

store the selected data in said persistent memory area; and restore the selected data in said persistent memory area for said registered component.

13. The device of claim 12, comprising at least one kernel module to notify said registered component about a snapshot action.

14. The device of claim 13, wherein said registered component is responsive to receiving a notification about the start of a snapshot image generation action and selects and stores data in said persistent memory area.

15. The device of claim 13, wherein said registered component is responsive to receiving a notification about the completion of a snapshot load action and restores the selected data from said persistent memory area.

16. The device according to claim 11, wherein said operating system comprises a kernel and a user space, wherein only said kernel is replaced with data from said snapshot image of said second instance of the operating system, while said user space is preserved.

* * * * *